(12) United States Patent
Chen et al.

(10) Patent No.: US 9,497,201 B2
(45) Date of Patent: *Nov. 15, 2016

(54) APPLYING SECURITY POLICY TO AN APPLICATION SESSION

(71) Applicant: A10 Networks, Inc., San Jose, CA (US)

(72) Inventors: Lee Chen, Saratoga, CA (US); Dennis Oshiba, Fremont, CA (US); John Chiong, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,076

(22) Filed: Jan. 4, 2016

(65) Prior Publication Data

US 2016/0119382 A1 Apr. 28, 2016

Related U.S. Application Data

(63) Continuation of application No. 14/323,884, filed on Jul. 3, 2014, now Pat. No. 9,270,705, which is a continuation of application No. 14/061,720, filed on Oct. 23, 2013, now Pat. No. 8,813,180, which is a
(Continued)

(51) Int. Cl.
*H04L 29/06* (2006.01)
*H04L 29/08* (2006.01)
(Continued)

(52) U.S. Cl.
CPC ......... *H04L 63/102* (2013.01); *H04L 63/0245* (2013.01); *H04L 63/0254* (2013.01);
(Continued)

(58) Field of Classification Search
CPC . H04L 63/20; H04L 63/0227; H04L 67/306; H04L 67/10; H04L 63/02; H04L 65/1026; H04L 63/0407; H04L 51/04; H04M 1/72547; G06F 21/00
See application file for complete search history.

(56) References Cited

U.S. PATENT DOCUMENTS 5,218,602 A 6/1993 Grant et al.
5,541,994 A 7/1996 Tomko et al.
(Continued)

FOREIGN PATENT DOCUMENTS

CN 1372662 A 10/2002
CN 1449618 A 10/2003
(Continued)

OTHER PUBLICATIONS

Cardellini et al., "Dynamic Load Balancing on Web-server Systems", IEEE Internet Computing, vol. 3, No. 3, pp. 28-39, May-Jun. 1999.
(Continued)

*Primary Examiner* — Carl Colin
*Assistant Examiner* — Gary Lavelle
(74) *Attorney, Agent, or Firm* — Carr & Ferrell LLP

(57) ABSTRACT

Applying a security policy to an application session, includes: recognizing the application session between a network and an application via a security gateway; determining by the security gateway a user identity of the application session using information about the application session; obtaining by the security gateway the security policy comprising network parameters mapped to the user identity; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session.

27 Claims, 11 Drawing Sheets

Related U.S. Application Data continuation of application No. 13/650,179, filed on Oct. 12, 2012, now Pat. No. 8,595,791, which is a continuation of application No. 12/788,339, filed on May 27, 2010, now Pat. No. 8,312,507, which is a continuation-in-part of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
  *G06F 21/00* (2013.01)
  *H04L 12/58* (2006.01)
  *H04M 1/725* (2006.01)
  *H04W 12/00* (2009.01)

(52) U.S. Cl.
  CPC ........... *H04L63/105* (2013.01); *H04L 63/164* (2013.01); *H04L 63/168* (2013.01); *H04L 63/20* (2013.01); *H04L 63/30* (2013.01); *G06F 21/00* (2013.01); *H04L 51/04* (2013.01); *H04L 63/02* (2013.01); *H04L 63/029* (2013.01); *H04L 63/0227* (2013.01); *H04L 63/0236* (2013.01); *H04L 63/0407* (2013.01); *H04L 65/1026* (2013.01); *H04L 67/10* (2013.01); *H04L 67/1004* (2013.01); *H04L 67/22* (2013.01); *H04L 67/306* (2013.01); *H04L 67/42* (2013.01); *H04L 69/28* (2013.01); *H04M 1/72547* (2013.01); *H04W 12/00* (2013.01)

(56) References Cited

U.S. PATENT DOCUMENTS

| | | | |
|---|---|---|---|
| 5,712,912 A | 1/1998 | Tomko et al. |
| 5,737,420 A | 4/1998 | Tomko et al. |
| 5,757,916 A | 5/1998 | MacDoran et al. |
| 5,774,660 A | 6/1998 | Brendel et al. |
| 5,832,091 A | 11/1998 | Tomko et al. |
| 5,935,207 A | 8/1999 | Logue et al. |
| 5,958,053 A | 9/1999 | Denker |
| 5,991,408 A | 11/1999 | Pearson et al. |
| 5,995,981 A | 11/1999 | Wikstrom |
| 6,003,069 A | 12/1999 | Cavill |
| 6,035,398 A | 3/2000 | Bjorn |
| 6,047,268 A | 4/2000 | Bartoli et al. |
| 6,131,163 A | 10/2000 | Wiegel |
| 6,167,517 A | 12/2000 | Gilchrist et al. |
| 6,182,146 B1 | 1/2001 | Graham-Cumming, Jr. |
| 6,182,221 B1 | 1/2001 | Hsu et al. |
| 6,219,706 B1 | 4/2001 | Fan et al. |
| 6,219,793 B1 | 4/2001 | Li et al. |
| 6,219,794 B1 | 4/2001 | Soutar et al. |
| 6,259,705 B1 | 7/2001 | Takahashi et al. |
| 6,310,966 B1 | 10/2001 | Dulude et al. |
| 6,317,834 B1 | 11/2001 | Gennaro et al. |
| 6,321,338 B1 | 11/2001 | Porras et al. |
| 6,374,300 B2 | 4/2002 | Masters |
| 6,459,682 B1 | 10/2002 | Ellesson et al. |
| 6,490,624 B1 | 12/2002 | Sampson et al. |
| 6,507,912 B1 | 1/2003 | Matyas, Jr. et al. |
| 6,587,866 B1 | 7/2003 | Modi et al. |
| 6,714,931 B1 | 3/2004 | Papierniak et al. |
| 6,748,084 B1 | 6/2004 | Gau et al. |
| 6,748,414 B1 | 6/2004 | Bournas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,901,145 B1 | 5/2005 | Bohannon et al. |
| 6,950,651 B2 | 9/2005 | Seligmann |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,095,852 B2 | 8/2006 | Wack et al. |
| 7,133,916 B2 | 11/2006 | Schunemann |
| 7,143,087 B2 | 11/2006 | Fairweather |
| 7,155,514 B1 | 12/2006 | Milford |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,237,267 B2 | 6/2007 | Rayes et al. |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,360,237 B2 | 4/2008 | Engle et al. |
| 7,370,353 B2 | 5/2008 | Yang |
| 7,376,969 B1 | 5/2008 | Njemanze et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,480,934 B2 | 1/2009 | Chan et al. |
| 7,484,089 B1 | 1/2009 | Kogen et al. |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,551,574 B1 | 6/2009 | Peden, II et al. |
| 7,552,126 B2 | 6/2009 | Chen et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,613,829 B2 | 11/2009 | Alve |
| 7,647,635 B2 | 1/2010 | Chen et al. |
| 7,653,633 B2 | 1/2010 | Villella et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,716,378 B2 | 5/2010 | Chen et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,804,956 B2 | 9/2010 | Chang et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,970,934 B1 * | 6/2011 | Patel ................ H04L 41/147 709/244 |
| 7,979,585 B2 | 7/2011 | Chen et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,104,091 B2 | 1/2012 | Qin et al. |
| 8,122,116 B2 | 2/2012 | Matsunaga et al. |
| 8,122,152 B2 | 2/2012 | Chittenden et al. |

(56) References Cited

U.S. PATENT DOCUMENTS

| | | | |
|---|---|---|---|
| 8,151,322 B2 | 4/2012 | Chen et al. | |
| 8,179,809 B1 | 5/2012 | Eppstein et al. | |
| 8,185,651 B2 | 5/2012 | Moran et al. | |
| 8,191,106 B2 * | 5/2012 | Choyi | H04L 63/20 713/150 |
| 8,224,971 B1 | 7/2012 | Miller et al. | |
| 8,234,650 B1 | 7/2012 | Eppstein et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,423,676 B2 | 4/2013 | Chen et al. | |
| 8,499,093 B2 | 7/2013 | Grosser et al. | |
| 8,539,075 B2 | 9/2013 | Bali et al. | |
| 8,554,929 B1 | 10/2013 | Szeto et al. | |
| 8,560,693 B1 | 10/2013 | Wang et al. | |
| 8,584,199 B1 | 11/2013 | Chen et al. | |
| 8,595,383 B2 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2 | 6/2014 | Casado et al. | |
| 8,782,221 B2 | 7/2014 | Han | |
| 8,782,751 B2 | 7/2014 | Chen et al. | |
| 8,813,180 B1 | 8/2014 | Chen et al. | |
| 8,826,372 B1 | 9/2014 | Chen et al. | |
| 8,868,765 B1 | 10/2014 | Chen et al. | |
| 8,879,427 B2 | 11/2014 | Krumel | |
| 8,885,463 B1 | 11/2014 | Medved et al. | |
| 8,897,154 B2 | 11/2014 | Jalan et al. | |
| 8,903,986 B1 | 12/2014 | Newstadt et al. | |
| 8,965,957 B2 | 2/2015 | Barros | |
| 8,977,749 B1 | 3/2015 | Han | |
| 8,990,262 B2 | 3/2015 | Chen et al. | |
| 9,060,003 B2 | 6/2015 | Wang et al. | |
| 9,076,027 B2 | 7/2015 | Miura et al. | |
| 9,094,364 B2 | 7/2015 | Jalan et al. | |
| 9,106,561 B2 | 8/2015 | Jalan et al. | |
| 9,122,853 B2 | 9/2015 | Thompson | |
| 9,154,584 B1 | 10/2015 | Han | |
| 9,215,275 B2 | 12/2015 | Kannan et al. | |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,270,774 B2 | 2/2016 | Jalan et al. | |
| 9,294,467 B2 | 3/2016 | Wang et al. | |
| 9,338,225 B2 | 5/2016 | Jalan et al. | |
| 9,344,421 B1 | 5/2016 | Chen et al. | |
| 9,350,744 B2 | 5/2016 | Chen et al. | |
| 9,356,910 B2 | 5/2016 | Chen et al. | |
| 9,386,088 B2 | 7/2016 | Zheng et al. | |
| 2001/0022558 A1 | 9/2001 | Karr, Jr. et al. | |
| 2001/0049741 A1 | 12/2001 | Skene et al. | |
| 2002/0032777 A1 | 3/2002 | Kawata et al. | |
| 2002/0078164 A1 | 6/2002 | Reinschmidt | |
| 2002/0091844 A1 | 7/2002 | Craft et al. | |
| 2002/0095587 A1 | 7/2002 | Doyle et al. | |
| 2002/0103916 A1 | 8/2002 | Chen et al. | |
| 2002/0133491 A1 | 9/2002 | Sim et al. | |
| 2002/0138618 A1 | 9/2002 | Szabo | |
| 2002/0143991 A1 | 10/2002 | Chow et al. | |
| 2002/0178259 A1 | 11/2002 | Doyle et al. | |
| 2002/0191575 A1 | 12/2002 | Kalavade et al. | |
| 2002/0194335 A1 | 12/2002 | Maynard | |
| 2002/0194350 A1 | 12/2002 | Lu et al. | |
| 2003/0009591 A1 | 1/2003 | Hayball et al. | |
| 2003/0014544 A1 | 1/2003 | Pettey | |
| 2003/0023711 A1 | 1/2003 | Parmar et al. | |
| 2003/0023873 A1 | 1/2003 | Ben-Itzhak | |
| 2003/0023874 A1 | 1/2003 | Prokupets et al. | |
| 2003/0035409 A1 | 2/2003 | Wang et al. | |
| 2003/0035420 A1 | 2/2003 | Niu | |
| 2003/0091028 A1 | 5/2003 | Chang et al. | |
| 2003/0101349 A1 | 5/2003 | Wang | |
| 2003/0105859 A1 | 6/2003 | Garnett et al. | |
| 2003/0131245 A1 | 7/2003 | Linderman | |
| 2003/0135625 A1 | 7/2003 | Fontes et al. | |
| 2003/0140232 A1 | 7/2003 | De Lanauze | |
| 2003/0140235 A1 | 7/2003 | Immega et al. | |
| 2003/0191989 A1 | 10/2003 | O'Sullivan | |
| 2003/0195962 A1 | 10/2003 | Kikuchi et al. | |
| 2003/0219121 A1 | 11/2003 | van Someren | |
| 2004/0015243 A1 | 1/2004 | Mercredi et al. | |
| 2004/0034784 A1 | 2/2004 | Fedronic et al. | |
| 2004/0049687 A1 | 3/2004 | Orsini et al. | |
| 2004/0059924 A1 | 3/2004 | Soto et al. | |
| 2004/0062246 A1 | 4/2004 | Boucher et al. | |
| 2004/0073703 A1 | 4/2004 | Boucher et al. | |
| 2004/0078419 A1 | 4/2004 | Ferrari et al. | |
| 2004/0078480 A1 | 4/2004 | Boucher et al. | |
| 2004/0081173 A1 | 4/2004 | Feather | |
| 2004/0111516 A1 | 6/2004 | Cain | |
| 2004/0128312 A1 | 7/2004 | Shalabi et al. | |
| 2004/0139057 A1 | 7/2004 | Hirata et al. | |
| 2004/0139108 A1 | 7/2004 | Tang et al. | |
| 2004/0141005 A1 | 7/2004 | Banatwala et al. | |
| 2004/0143599 A1 | 7/2004 | Shalabi et al. | |
| 2004/0153553 A1 | 8/2004 | Chotkowski et al. | |
| 2004/0167912 A1 | 8/2004 | Tsui et al. | |
| 2004/0187032 A1 | 9/2004 | Gels et al. | |
| 2004/0194114 A1 | 9/2004 | Spiegel | |
| 2004/0199616 A1 | 10/2004 | Karhu | |
| 2004/0199646 A1 | 10/2004 | Susai et al. | |
| 2004/0202182 A1 | 10/2004 | Lund et al. | |
| 2004/0210623 A1 | 10/2004 | Hydrie et al. | |
| 2004/0210663 A1 | 10/2004 | Phillips et al. | |
| 2004/0213158 A1 | 10/2004 | Collett et al. | |
| 2004/0224664 A1 | 11/2004 | Guo | |
| 2004/0242200 A1 | 12/2004 | Maeoka et al. | |
| 2004/0253956 A1 | 12/2004 | Collins | |
| 2004/0254919 A1 | 12/2004 | Giuseppini | |
| 2004/0260651 A1 | 12/2004 | Chan et al. | |
| 2005/0005207 A1 | 1/2005 | Herneque | |
| 2005/0009520 A1 * | 1/2005 | Herrero | H04L 29/12188 455/435.1 |
| 2005/0010930 A1 | 1/2005 | Vaught | |
| 2005/0018618 A1 | 1/2005 | Mualem et al. | |
| 2005/0021848 A1 | 1/2005 | Jorgenson | |
| 2005/0027862 A1 | 2/2005 | Nguyen et al. | |
| 2005/0036501 A1 | 2/2005 | Chung et al. | |
| 2005/0036511 A1 | 2/2005 | Baratakke et al. | |
| 2005/0044270 A1 | 2/2005 | Grove et al. | |
| 2005/0074013 A1 | 4/2005 | Hershey et al. | |
| 2005/0080890 A1 | 4/2005 | Yang et al. | |
| 2005/0086502 A1 | 4/2005 | Rayes et al. | |
| 2005/0089048 A1 | 4/2005 | Chittenden et al. | |
| 2005/0102400 A1 | 5/2005 | Nakahara et al. | |
| 2005/0108518 A1 | 5/2005 | Pandya | |
| 2005/0114186 A1 | 5/2005 | Heinrich | |
| 2005/0114321 A1 | 5/2005 | DeStefano et al. | |
| 2005/0125276 A1 * | 6/2005 | Rusu | G06Q 30/02 705/304 |
| 2005/0144480 A1 | 6/2005 | Kim et al. | |
| 2005/0163073 A1 | 7/2005 | Heller et al. | |
| 2005/0182969 A1 | 8/2005 | Ginter et al. | |
| 2005/0198335 A1 | 9/2005 | Brown et al. | |
| 2005/0204162 A1 | 9/2005 | Rayes et al. | |
| 2005/0213586 A1 | 9/2005 | Cyganski et al. | |
| 2005/0240989 A1 | 10/2005 | Kim et al. | |
| 2005/0249225 A1 | 11/2005 | Singhal | |
| 2005/0259586 A1 | 11/2005 | Hafid et al. | |
| 2005/0283609 A1 | 12/2005 | Langford | |
| 2006/0023721 A1 | 2/2006 | Miyake et al. | |
| 2006/0036610 A1 | 2/2006 | Wang | |
| 2006/0036733 A1 | 2/2006 | Fujimoto et al. | |
| 2006/0064478 A1 | 3/2006 | Sirkin | |
| 2006/0069687 A1 | 3/2006 | Cui et al. | |
| 2006/0069774 A1 | 3/2006 | Chen et al. | |
| 2006/0069804 A1 | 3/2006 | Miyake et al. | |
| 2006/0077926 A1 * | 4/2006 | Rune | H04L 45/34 370/328 |
| 2006/0083372 A1 | 4/2006 | Chang et al. | |
| 2006/0092950 A1 | 5/2006 | Arregoces et al. | |
| 2006/0098645 A1 | 5/2006 | Walkin | |

(56) References Cited

U.S. PATENT DOCUMENTS

| | | |
|---|---|---|
| 2006/0112170 A1 | 5/2006 | Sirkin |
| 2006/0140452 A1 | 6/2006 | Raynor et al. |
| 2006/0165226 A1 | 7/2006 | Ernst et al. |
| 2006/0168319 A1 | 7/2006 | Trossen |
| 2006/0173977 A1 | 8/2006 | Ho et al. |
| 2006/0187901 A1 | 8/2006 | Cortes et al. |
| 2006/0190997 A1 | 8/2006 | Mahajani et al. |
| 2006/0209789 A1* | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0011300 A1 | 1/2007 | Hollebeek et al. |
| 2007/0019543 A1 | 1/2007 | Wei et al. |
| 2007/0032247 A1 | 2/2007 | Shaffer et al. |
| 2007/0067441 A1 | 3/2007 | Pomerantz |
| 2007/0067838 A1 | 3/2007 | Bajko |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0121560 A1 | 5/2007 | Edge |
| 2007/0156919 A1 | 7/2007 | Potti et al. |
| 2007/0165622 A1 | 7/2007 | O'Rourke et al. |
| 2007/0179986 A1 | 8/2007 | Adam |
| 2007/0180101 A1 | 8/2007 | Chen et al. |
| 2007/0185998 A1 | 8/2007 | Touitou et al. |
| 2007/0195792 A1 | 8/2007 | Chen et al. |
| 2007/0206746 A1 | 9/2007 | Andreasson et al. |
| 2007/0230337 A1 | 10/2007 | Igarashi et al. |
| 2007/0245090 A1 | 10/2007 | King et al. |
| 2007/0259673 A1* | 11/2007 | Willars ............. H04W 52/0225 455/453 |
| 2007/0271598 A1 | 11/2007 | Chen et al. |
| 2007/0282855 A1 | 12/2007 | Chen et al. |
| 2007/0283141 A1 | 12/2007 | Pollutro et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1* | 12/2007 | Strub ................... H04L 63/102 |
| 2008/0002684 A1 | 1/2008 | Kumazawa et al. |
| 2008/0031263 A1 | 2/2008 | Ervin et al. |
| 2008/0080398 A1 | 4/2008 | Yasuie et al. |
| 2008/0101396 A1 | 5/2008 | Miyata |
| 2008/0104276 A1 | 5/2008 | Lahoti et al. |
| 2008/0109452 A1 | 5/2008 | Patterson |
| 2008/0109870 A1* | 5/2008 | Sherlock ............. H04L 63/1425 726/1 |
| 2008/0109887 A1 | 5/2008 | Chen et al. |
| 2008/0130898 A1 | 6/2008 | Holtmanns et al. |
| 2008/0134332 A1 | 6/2008 | Keohane et al. |
| 2008/0148357 A1 | 6/2008 | Chen et al. |
| 2008/0162679 A1 | 7/2008 | Maher et al. |
| 2008/0228781 A1 | 9/2008 | Chen et al. |
| 2008/0229418 A1 | 9/2008 | Chen et al. |
| 2008/0250099 A1 | 10/2008 | Shen et al. |
| 2008/0263209 A1 | 10/2008 | Pisharody et al. |
| 2008/0263626 A1 | 10/2008 | Bainter et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0037361 A1 | 2/2009 | Prathaban et al. |
| 2009/0047952 A1 | 2/2009 | Giaretta et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213763 A1 | 8/2009 | Dunsmore et al. |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0292924 A1 | 11/2009 | Johnson et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0153544 A1 | 6/2010 | Krassner et al. |
| 2010/0159955 A1 | 6/2010 | Aerrabotu |
| 2010/0162378 A1 | 6/2010 | Jayawardena et al. |
| 2010/0188975 A1 | 7/2010 | Raleigh |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0055913 A1 | 3/2011 | Wong |
| 2011/0060831 A1 | 3/2011 | Ishii et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0239289 A1 | 9/2011 | Wang et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |

(56) References Cited

U.S. PATENT DOCUMENTS

| | | |
|---|---|---|
| 2012/0173759 A1 | 7/2012 | Agarwal et al. |
| 2012/0191839 A1 | 7/2012 | Maynard |
| 2012/0204236 A1 | 8/2012 | Chen et al. |
| 2012/0216266 A1 | 8/2012 | Wang et al. |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0036342 A1 | 2/2013 | Deo et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0148500 A1 | 6/2013 | Sonoda et al. |
| 2013/0166731 A1 | 6/2013 | Yamanaka et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0059702 A1 | 2/2014 | Wang et al. |
| 2014/0089500 A1 | 3/2014 | Sankar et al. |
| 2014/0143149 A1 | 5/2014 | Aissi |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0229268 A1 | 8/2014 | Clapp et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0347479 A1 | 11/2014 | Givon |
| 2014/0359052 A1 | 12/2014 | Joachimpillai et al. |
| 2014/0380424 A1 | 12/2014 | Thompson |
| 2015/0012746 A1 | 1/2015 | Kulkarni et al. |
| 2015/0039671 A1 | 2/2015 | Jalan et al. |
| 2015/0085650 A1 | 3/2015 | Cui et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312237 A1 | 10/2015 | Wang et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2015/0365410 A1 | 12/2015 | Thompson |
| 2015/0381465 A1 | 12/2015 | Narayanan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2016/0182456 A1 | 6/2016 | Wang et al. |
| 2016/0261642 A1 | 9/2016 | Chen et al. |

FOREIGN PATENT DOCUMENTS

| | | |
|---|---|---|
| CN | 1529460 A | 9/2004 |
| CN | 1575582 A | 2/2005 |
| CN | 1714545 A | 12/2005 |
| CN | 1725702 A | 1/2006 |
| CN | 101004740 A | 7/2007 |
| CN | 101094225 A | 12/2007 |
| CN | 101163336 A | 4/2008 |
| CN | 101169785 A | 4/2008 |
| CN | 101189598 A | 5/2008 |
| CN | 101247349 A | 8/2008 |
| CN | 101261644 A | 9/2008 |
| CN | 101361037 A | 2/2009 |
| CN | 101375253 A | 2/2009 |
| CN | 102098316 A | 6/2011 |
| CN | 101361037 B | 7/2011 |
| CN | 102123156 A | 7/2011 |
| CN | 101375253 B | 9/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 102123156 B | 11/2014 |
| CN | 104137491 A | 11/2014 |
| CN | 104796396 A | 7/2015 |
| CN | 102098316 B | 9/2015 |
| CN | 102577252 B | 3/2016 |
| CN | 102918801 B | 5/2016 |
| EP | 1209876 A2 | 5/2002 |
| EP | 1770915 A1 | 4/2007 |
| EP | 1885096 A1 | 2/2008 |
| EP | 02296313 A1 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| IN | 3764CHENP2014 A | 9/2015 |
| JP | H09097233 | 4/1997 |
| JP | 1999096128 | 4/1999 |
| JP | H11338836 A | 12/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2013528330 A | 7/2013 |
| JP | 2014143686 A | 8/2014 |
| JP | 2015507380 A | 3/2015 |
| JP | 5855663 B2 | 12/2015 |
| JP | 5946189 B2 | 6/2016 |
| KR | 100830413 B1 | 5/2008 |
| KR | 1020130096624 | 8/2013 |
| KR | 101576585 B1 | 12/2015 |
| KR | 101632187 | 6/2016 |
| TW | I175810 | 4/2003 |
| TW | I249314 B | 2/2006 |

(56) References Cited

FOREIGN PATENT DOCUMENTS

| WO | WO0113228 | | 2/2001 |
|---|---|---|---|
| WO | WO0114990 | | 3/2001 |
| WO | WO0145349 | | 6/2001 |
| WO | WO0221788 | | 3/2002 |
| WO | WO03103237 | | 12/2003 |
| WO | WO2004084085 | A1 | 9/2004 |
| WO | WO2006098033 | A1 | 9/2006 |
| WO | WO2008053954 | A1 | 5/2008 |
| WO | WO2008067013 | A2 | 6/2008 |
| WO | WO2008070248 | A2 | 6/2008 |
| WO | WO2008078593 | A1 | 7/2008 |
| WO | WO2011049770 | A2 | 4/2011 |
| WO | WO2011079381 | A1 | 7/2011 |
| WO | WO2011149796 | A2 | 12/2011 |
| WO | WO2012050747 | A2 | 4/2012 |
| WO | WO2012075237 | A2 | 6/2012 |
| WO | WO2013070391 | A1 | 5/2013 |
| WO | WO2013081952 | A1 | 6/2013 |
| WO | WO2013096019 | A1 | 6/2013 |
| WO | WO2013112492 | A1 | 8/2013 |
| WO | WO2014031046 | A1 | 2/2014 |
| WO | WO2014052099 | A2 | 4/2014 |
| WO | WO2014088741 | A1 | 6/2014 |
| WO | WO2014093829 | A1 | 6/2014 |
| WO | WO2014138483 | A1 | 9/2014 |
| WO | WO2014144837 | A1 | 9/2014 |
| WO | WO2014179753 | A2 | 11/2014 |
| WO | WO2014209660 | A1 | 12/2014 |
| WO | WO2015153020 | A1 | 10/2015 |

OTHER PUBLICATIONS

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with lynamic workloads", The Journal of Supercomputing, Kluwer Academic Publishers, BO, vol. 53, No. 3, Jul. 3, 2009.

Goldszmidt et al. NetDispatcher: A TCP Connection Router, IBM Research Report RC 20853, May 19, 1997.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

"How to Create a Rule in Outlook 2003" CreateaRule-Outlook2003.doc 031405 mad.

Eychenne, Herve, "WFLOGS," Dec. 15, 2002, URL: <http://web.archive.org/web/20021205151706/http://www.wallfire.org/wflogs/wflogs.8.html>.

Microsoft Corporation, "To Filter events in an event log," Jul. 2, 2004, URL: <http://web.archive.org/web/20040702070538/http://www.microsoft.com/resources/documentation/windows/xp/all/proddocs/en-us/nt_filteringevents_how_ev.mspx>.

The Cable Guy, "Configuring the Routing and Remote Access Service in Windows 2000," Microsoft TechNet, Jul. 22, 2004, URL: <http://web.archive.org/web/20040722111534/http://www.microsoft.com/technet/community/columns/cableguy/cg0601.mspx>.

Monrose et al., "Cryptographic Key Generation from Voice," Proceedings of the 2001 IEEE Symposium on Security and Privacy, pp. 202-213, May 2001.

Shamir, "How to share a secret," Communications of the ACM, vol. 22, No. 11, pp. 612-613, Nov. 1979.

Jermyn et al., "The Design and Analysis of Graphical Passwords," 8th USENIX Security Symposium ; Aug. 1999; 15 pp.

Soutar et al., "Biometric Encryption™," Bioscrypt Inc., 1999, pp. 1-28.

Duda et al., "Pattern Classification," Second Edition; 2001; pp. 117-121.

Zhang et al.; "Personal Authentication Based on Generalized Symmetric Max Minimal Distance in Subspace;" 2003; IEEE; pp. 245-248.

Okada et al.; "An Optimal Orthonormal System for Discriminant Analysis"; 1985; Pattern Recognition, vol. 18, No. 2; pp. 139-144.

Chang et al.; "Biometrics-Based Cryptographic Key Generation;" In Multimedia and Expo, Jun. 2004. ICME'04. 2004 IEEE International Conference on (vol. 3, pp. 2203-2206). IEEE.

Zhang et al.; "Optimal Thresholding for Key Generation Based on Biometrics;" In Image Processing, Oct. 2004. ICIP'04. 2004 International Conference on (vol. 5, pp. 3451-3454). IEEE.

Marandon, Alex, "How to Build a Web Widget (Using jQuery)," Jun. 2010, URL: <https://web.archive.org/web/20100623004301/http://alexmarandon.com/articles/web_widget_jquery/>.

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

\* cited by examiner

Network Traffic Policy 451

Network based Application Session Access Control
Session Connection Rate Control
Traffic Shaping Control
Bandwidth Rate Capacity
Quality of Service or DSCP Marking Control
Packet Forwarding Control
Link Interface Preference
Server Load Balancing Preference
Application Session Modification Control

FIG. 8

APPLYING SECURITY POLICY TO AN APPLICATION SESSION

CROSS-REFERENCE TO RELATED APPLICATIONS

The present application is a continuation and claims the priority benefit of U.S. patent application Ser. No. 14/323,884, filed on Jul. 3, 2014, issued on Feb. 23, 2016, as U.S. Pat. No. 9,270,705; which in turn is a continuation of U.S. patent application Ser. No. 14/061,720, filed on Oct. 23, 2013, issued on Aug. 19, 2014, as U.S. Pat. No. 8,813,180; which in turn is a continuation of U.S. patent application Ser. No. 13/650,179, filed on Oct. 12, 2012, issued on Nov. 26, 2013, as U.S. Pat. No. 8,595,791; which in turn is a continuation of U.S. patent application Ser. No. 12/788,339, filed on May 27, 2010, issued on Nov. 13, 2012 as U.S. Pat. No. 8,312,507; which in turn is a continuation-in-part of U.S. patent application Ser. No. 12/771,491, filed on Apr. 30, 2010, issued on Jul. 12, 2011, as U.S. Pat. No. 7,979,585; which in turn is a continuation of U.S. patent application Ser. No. 11/582,613, filed on Oct. 17, 2006, issued on May 11, 2010, as U.S. Pat. No. 7,716,378. The disclosures of each of the above referenced applications are hereby incorporated by reference.

BACKGROUND OF THE INVENTION

1. Field

This invention relates generally to data networking, and more specifically, to a system and method to apply a network traffic policy based on a user identity during an application session.

2. Related Art

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NG01-60410". Subsequent information exchange using the company's office applications, such as email, file transfer or document control is traceable based on the private user identity through network event logs.

Since the late 1990's, we have been witnessing the phenomenal rising popularity of public communication applications and services, such as email and Instant Messaging offered by Yahoo™, America Online™ (AOL), or Google™, conferencing and collaboration services offered by WebEx™ or Centra™, or peer-to-peer services for a variety of file sharing. Generally, a public communication service allows a user to exchange information through messaging, text chat or document exchange using a public user identity, such as "butterdragon", "fingemail1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean@Yahoo.com".

In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

The above discussion illustrates the need for a security solution to associate a user identity to a public application.

BRIEF SUMMARY OF THE INVENTION

Method for applying a security policy to an application session, includes: recognizing the application session between a network and an application via a security gateway; determining by the security gateway a user identity of the application session using information about the application session; obtaining by the security gateway the security policy comprising network parameters mapped to the user identity; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session.

BRIEF DESCRIPTION OF THE DRAWINGS

FIG. 8 illustrates a plurality of embodiments of network traffic policy.

DETAILED DESCRIPTION OF THE INVENTION

Figure 1A:
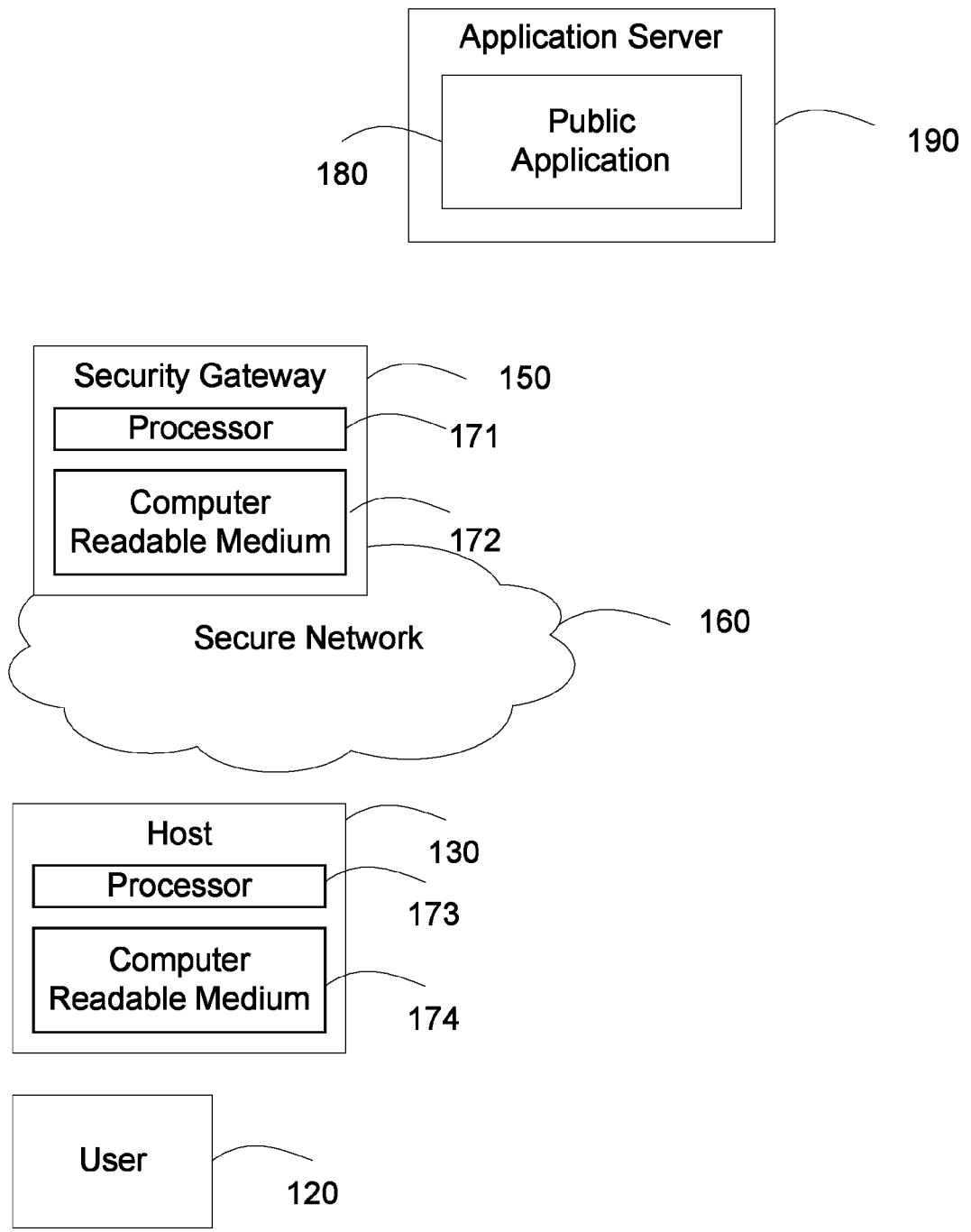
FIG. 1A illustrates a secure network.

FIG. 1A illustrates a secure network.

A secure network 160 includes a host 130. User 120 uses host 130 to access a public application 180 hosted in application server 190. Application server 190 is outside of secure network 160. The network traffic between host 130 and application server 190 passes through security gateway 150. The security gateway 150 is operationally coupled to a processor 171 and a computer readable medium 172. The computer readable medium 172 stores computer readable program code for implementing the various embodiments of the present invention as described herein.

Host 130 is a computing device with network access capabilities. The host 130 is operationally coupled to a processor 173 and a computer readable medium 174. The computer readable medium 174 stores computer readable program code for implementing the various embodiments of the present invention as described herein. In some embodiments, host 130 is a workstation, a desktop personal computer or a laptop personal computer. In some embodiments, host 130 is a Personal Data Assistant (PDA), a smartphone, or a cellular phone.

In some embodiments, secure network 160 is an Internet Protocol (IP) network. In some embodiments, secure network 160 is a corporate data network or a regional corporate data network. In some embodiments, secure network 160 is an Internet service provider network. In some embodiments, secure network 160 is a residential data network. In some embodiments, secure network 160 includes a wired network such as Ethernet. In some embodiments, secure network 160 includes a wireless network such as a WiFi network.

Public application 180 provides a service that allows user 120 to communicate with other users in a real-time fashion. In some embodiments, the service includes text chat. In some embodiments, the service includes a voice call or a video call. In some embodiments, the service includes a network game. In some embodiments, the service includes exchanging a document, such as sending or receiving a text document, a PowerPoint™ presentation, an Excel™ spreadsheet, an image file, a music file or a video clip. In some embodiments, the service includes a collaborative document processing such as creating a document, a business plan, an agreement, wherein user 120 collaborates with other users in a real time fashion. In some embodiments, the service includes a collaborative information exchange such as a conference call. In some embodiments, the service is a social networking service. In some embodiments, the service includes real-time collaboration and non real-time collaboration.

In one example, public application 180 provides America Online Instant Messenger™ service. In one example, public application 180 provides Yahoo Instant Messenger™ voice service. In some embodiments, public application 180 provides a file sharing service such as Kazaa™ file sharing service. In some embodiments, public application 180 provides a network game service such as Microsoft™ Network Game service. In some embodiments, public application 180 provides an on-line collaborative document processing such as Google Docs™, and Salesforce.com™. In some embodiments, public application 180 provides an on-line information exchange and communications such as WebEx™. In some embodiments, public application 180 provides live information streaming such as live video streaming, live audio streaming, and instantaneous picture uploading.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server 190 and transmits the network traffic to secure network 160.

In some embodiments, security gateway 150 includes the function of a corporate Wide Area Network (WAN) gateway. In some embodiments, security gateway 150 includes the function of a residential broadband gateway. In some embodiments, security gateway 150 includes the function of a WAN gateway for an Internet service provider.

Figure 1B:
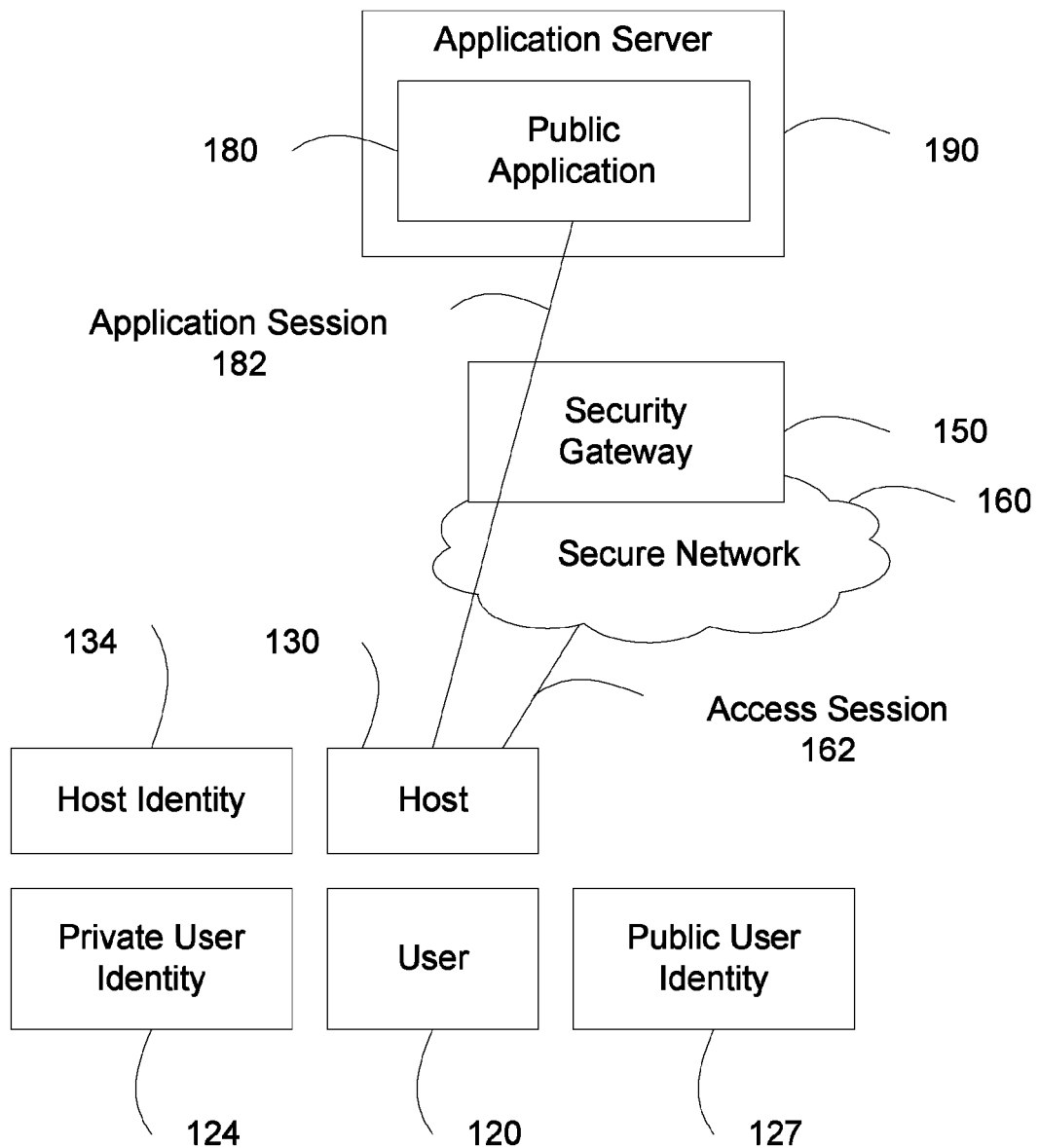
FIG. 1B illustrates an access session and an application session.

FIG. 1B illustrates an access session and an application session.

User 120 uses host 130 to access secure network 160 during an access session 162.

Host 130 has a host identity 134. Host 130 uses host identity 134 to connect to secure network 160. In some embodiments, host identity 134 includes an IP address. In some embodiments, host identity 134 includes a Media Access Control (MAC) address.

Within secure network 160, user 120 has a private user identity 124. In some embodiments, private user identity 124 is an employee number or an employee name. In some embodiments, private user identity 124 is an Internet service subscription identity. In some embodiments, access session 162 is established after a successful network user log-in procedure, such as an employee network log-in, for secure network 160 using private user identity 124. Private user identity 124 is associated with host identity 134. In some embodiments, host 130 is a guest computing device. Private user identity 124 is associated with an Ethernet switch port where host 130 connects. In this embodiment, private user identity 124 is a port number, an Ethernet interface identity, or an Ethernet VLAN identity.

User 120 uses host 130 to access public application 180 in an application session 182. User 120 uses a public user identity 127 during application session 182. In some embodiments, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In some embodiments, public user identity 127 is set up through a user registration process or a service subscription process. Network traffic in application session 182 passes through security gateway 150.

Figure 1C:
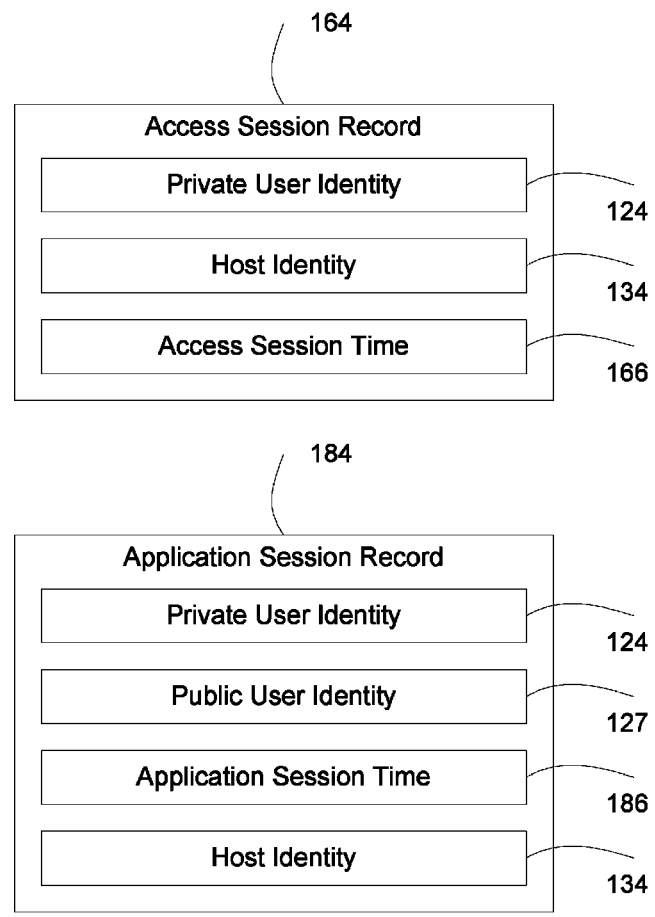
FIG. 1C illustrates an access session record and an application session record.

FIG. 1C illustrates an access session record and an application session record.

Access session record 164 records information about access session 162. The information includes private user identity 124, host identity 134 and access session time 166. In some embodiments, access session time 166 is the starting time when access session 162 is established. In some embodiments, access session time 166 includes the starting time and the ending time when user 120 finishes access session 162. In some embodiments, access session time 166 is a time stamp for a time during access session 162.

Application session record 184 records information about application session 182. The information includes private user identity 124, public user identity 127, and application session time 186. In some embodiments, the information further includes host identity 134. In some embodiments, application session time 186 includes the starting time when application session 182 is established. In some embodiments, application session time 186 includes a time stamp during application session 182. In some embodiments, application session time 186 includes a time stamp when security gateway 150 recognizes application session 182.

Figure 2:
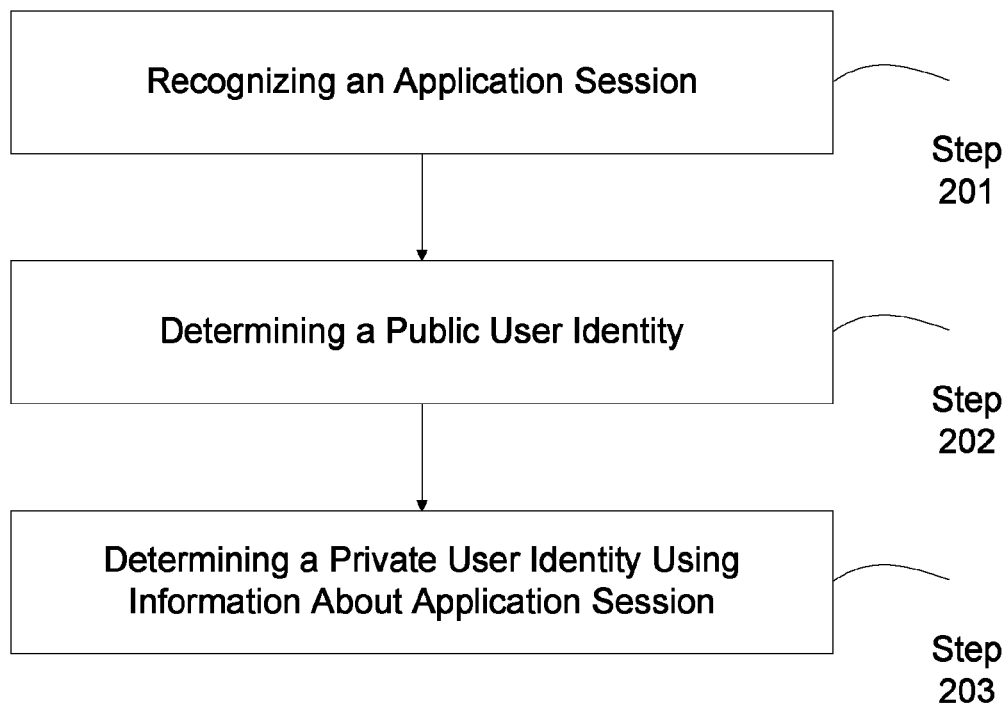
FIG. 2 illustrates a process to generate an application session record.

FIG. 2 illustrates a process to generate an application session record.

The process of generating application session record 184 includes multiple steps.

In step 201, security gateway 150 recognizes an application session.

In step 202, security gateway 150 determines a public user identity of the application session.

In step 203, security gateway 150 determines a private user identity using information about the application session.

Figure 3:
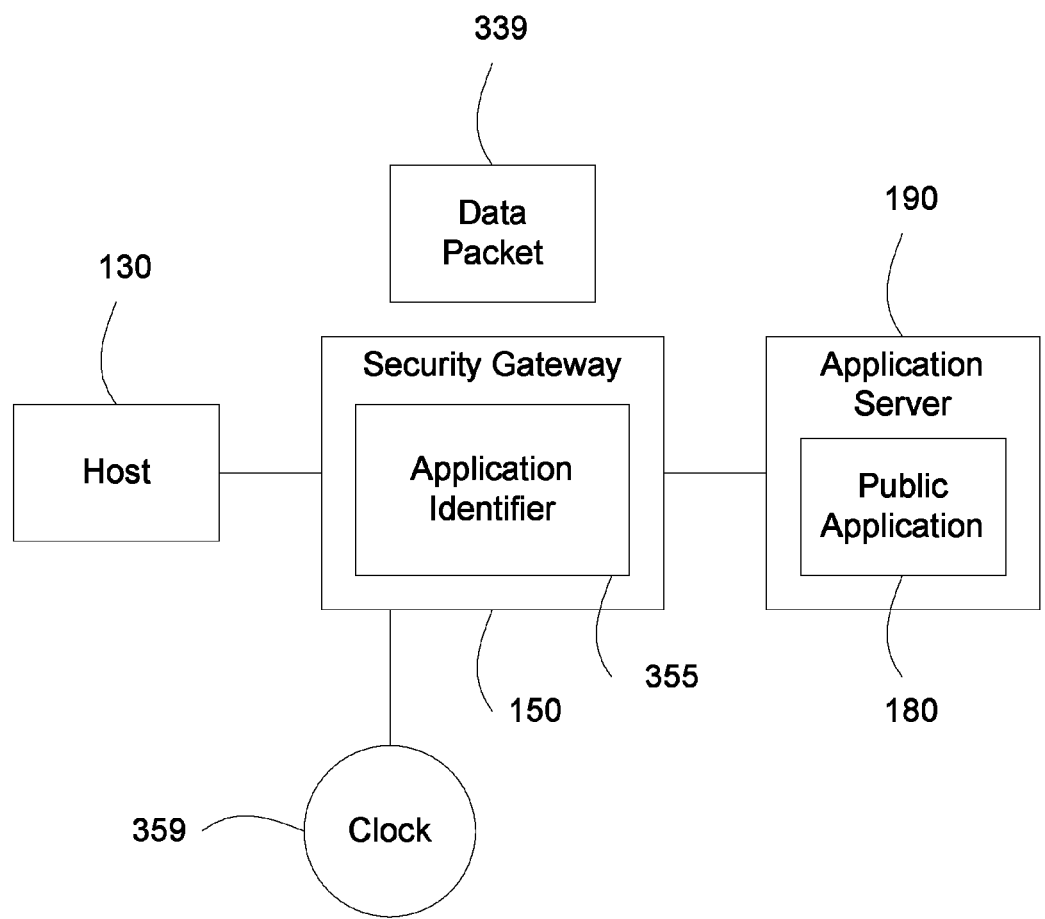
FIG. 3 illustrates a process to recognize an application session.
Figure 4A:
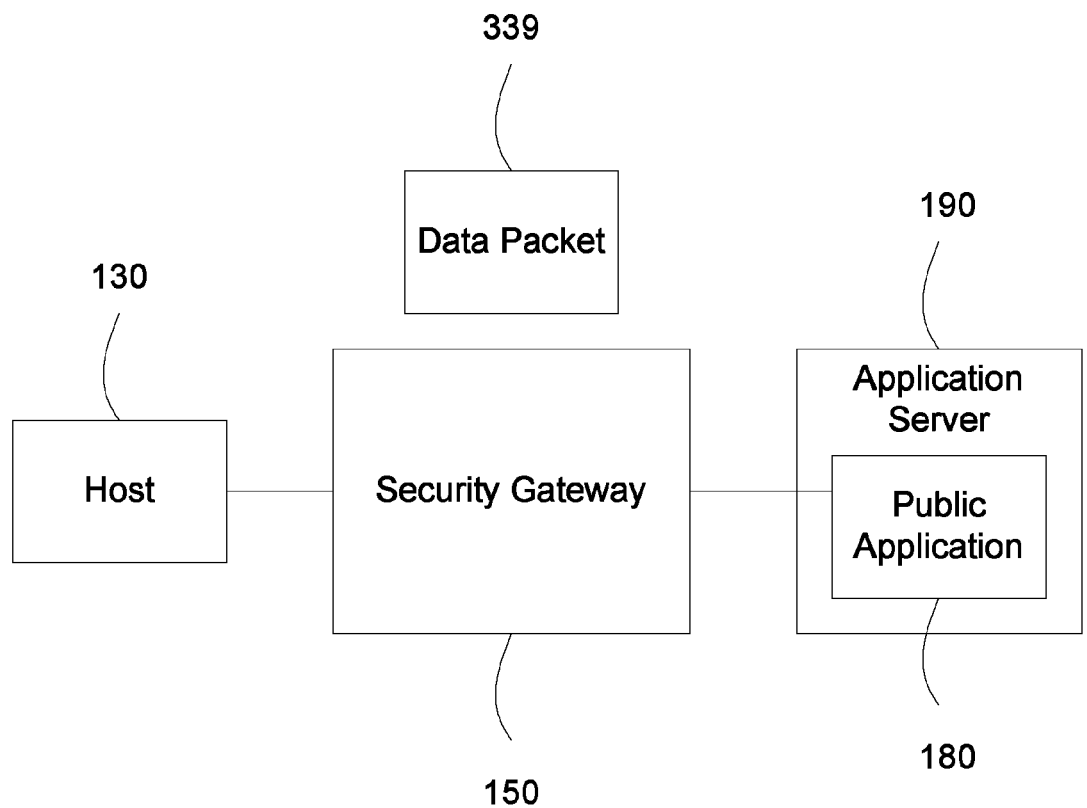
FIG. 4A illustrates a process to determine a public user identity of application session.
Figure 4B:
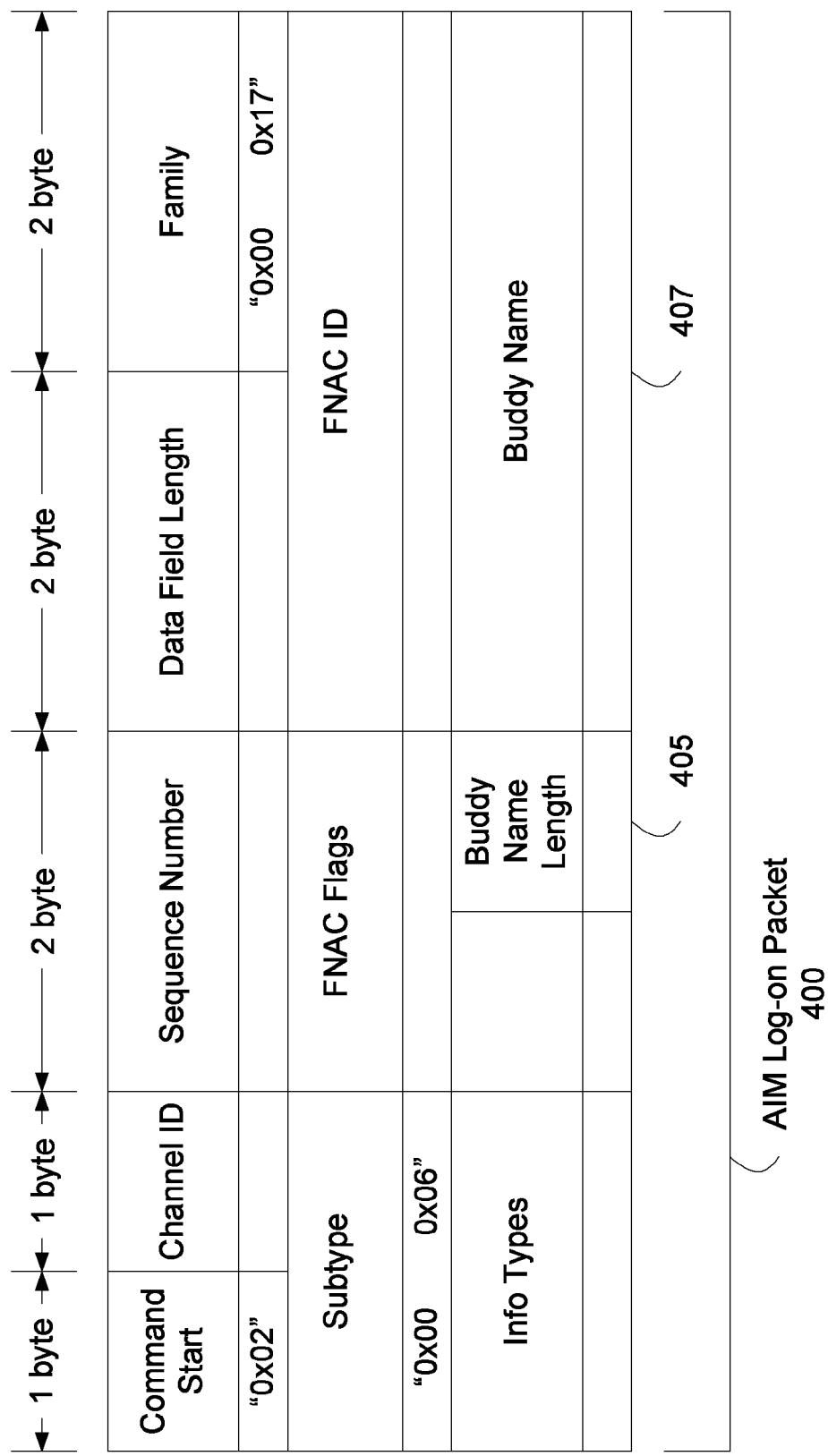
FIG. 4B illustrates a data packet in an AIM log-on packet.
Figure 5:
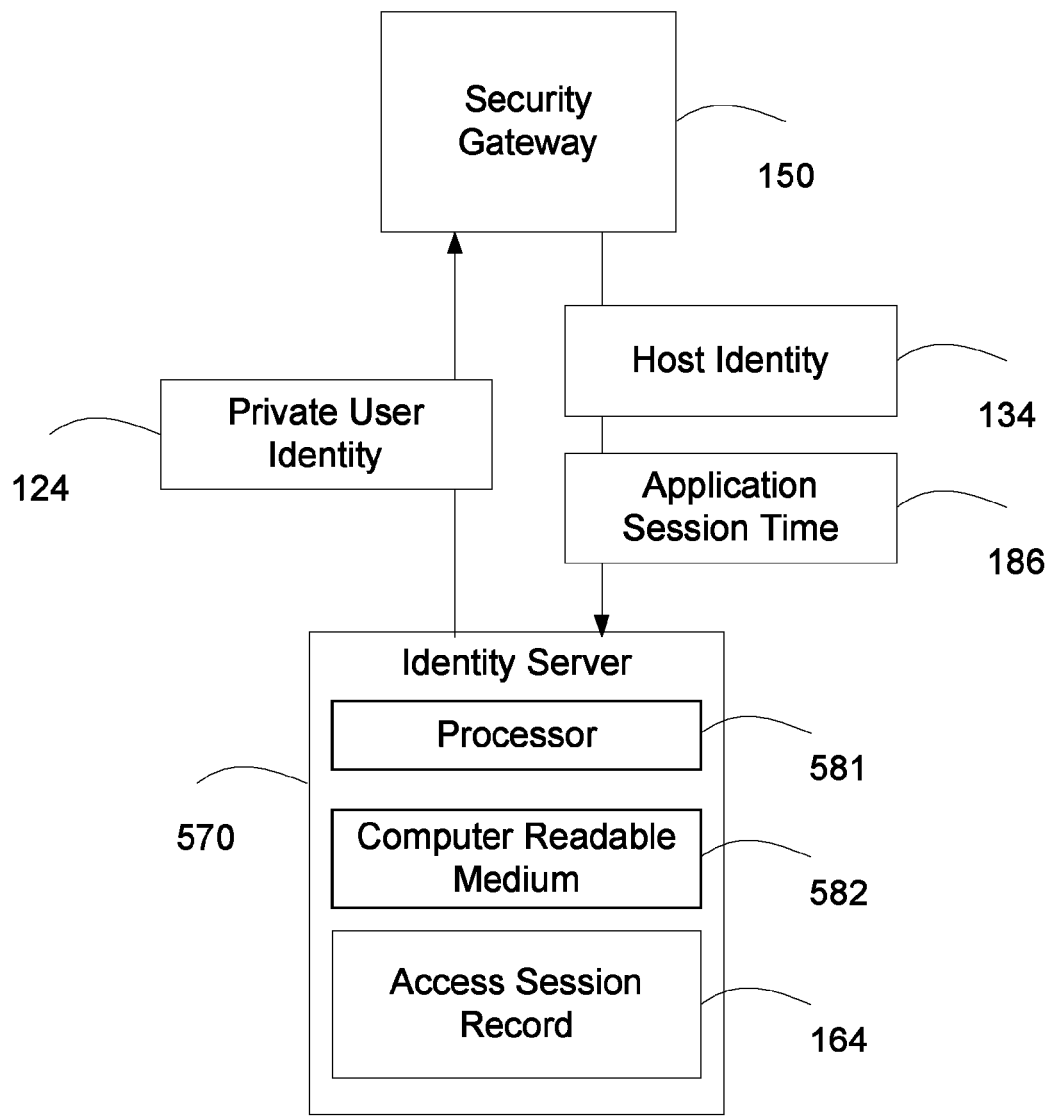
FIG. 5 illustrates a process to determine a private user identity.

FIGS. 3-5 illustrates steps 201-203 respectively.

FIG. 3 illustrates a process to recognize an application session.

Security gateway 150 inspects network traffic between host 130 and application server 190 to recognize application session 182 for public application 180.

In some embodiments, security gateway 150 inspects data packet 339 between host 130 and application server 190 for the recognition of application session 182.

Security gateway 150 includes an application identifier 355 for public application 180. Application identifier 355 includes information for recognizing application session 182. In some embodiments, application identifier 355 includes a transport layer information, such as Transmission Control Protocol (TCP) or User Diagram Protocol (UDP); and at least one transport port number, such as a TCP port number or a UDP port number. In some embodiments, application identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADEH"].

Security gateway 150 matches data packet 339 against application identifier 355.

In some embodiments, application identifier 355 includes transport protocol type of TCP and a destination TCP port number of 5190, the TCP port number used by AIM protocol. In this embodiment, data packet 339 is a TCP packet from host 130 to application server 190. Security gateway 150 matches data packet 339 against application identifier 355 and determines that public application 180 provides AIM service.

Security gateway 150 creates application session record 184. Security gateway 150 extracts the source IP address from the IP header of data packet 339, and stores the source IP address as host identity 134. In some embodiments, data packet 339 includes link layer information, such as a source MAC address; security gateway 150 extracts and stores the source MAC address as host identity 134.

In some embodiments, security gateway 150 connects to a clock 359. Clock 359 indicates the current time of day. Security gateway 150 stores the time of day indicated by clock 359 in application session time 186.

FIG. 4A illustrates a process to determine a public user identity of application session 182.

The method for determining public user identity 127 is typically specific to public application 180. In some embodiments, data packet 339 is an application packet. For example, public application 180 provides AIM service; data packet 339 is an AIM packet.

An AIM packet includes multiple fields, for example
Command start field is a 1-byte data field starting at byte offset 0 having a fixed hexadecimal value "0x02";
Channel ID field is a 1-byte data field starting at byte offset 1;
Sequence number field is a 2-byte integer starting at byte offset 2;
Data field length field is a 2-byte data field starting at byte offset 4;
Family field is a 2-byte data field starting at byte offset 6; and
Subtype field is a 2-byte data field starting at byte offset 8.

An AIM log-on packet is a AIM packet with family field having a fixed hexadecimal value of "0x00 0x17" and subtype field having a fixed hexadecimal value of "0x00 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In some embodiments, data packet 339 is an AIM log-on packet 400 illustrated in FIG. 4B. Security gateway 150 extracts buddy name length field 405. Security gateway 150 furthers extracts buddy name field 407. In this embodiment, buddy name length field 405 is integer "13" and buddy name field 407 is "JohnSmithI984". Security gateway 150 stores "JohnSmithI984" as public user identity 127 in application session record 184.

In some embodiments, data packet 339 is not an AIM log-on packet. Security gateway 150 inspects another data packet from host 130.

FIG. 5 illustrates a process to determine a private user identity.

Secure network 160 includes an identity server 570. The identity server 570 is operationally coupled to a processor 581 and a computer readable medium 582. The computer readable medium 582 stores computer readable program code for implementing the various embodiments of the present invention as described herein. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164. Identity server 570 determines that host identity 134 matches host identity of access session record 164. Identity server 570 further determines that application session time 186 matches access session time 166 of access session record 164 as application session time 186 is between the starting time and the ending time of access session record 164. Identity server 570 sends private user identity 124 of access session record 164 to security gateway 150 as a response to the query.

Security gateway 150 receives private user identity 124 from identity server 570, and stores private user identity 124 in application session record 184.

In some embodiments, security gateway 150 stores public user identity 127 in application session record 184 after recognizing a log-on approval indication for the public user identity 127 from public application 180.

In some embodiments, security gateway 150 queries identity server 570 immediately after determining public user identity 127. In some embodiments, security gateway 150 queries identity server 570 after application session 182 ends.

In some embodiments, security gateway 150 queries identity server 570 by sending a plurality of host identities in a bulk request; and receives a plurality of private user identities in a bulk response.

In some embodiments, application session record 184 includes additional user information associated with private user identity 124, such as cubicle or office number, cubicle or office location, telephone number, email address, maildrop location, department name/identity, or manager name.

In some embodiments, security gateway 150 obtains the additional user information from identity server 570. In some embodiments, security gateway 150 obtains the additional user information by querying a different server, such as a corporate directory server, by using the private user identity 124 received from identity server 570.

In some embodiments, public application 180 provides file transfer service using File Transfer Protocol (FTP) protocol or a proprietary protocol. In some embodiments, public application 180 provides email service using Simple Mail Transfer Protocol (SMTP), Internet Message Access Protocol (IMAP) or Post Office Protocol version 3 (POP3) protocol.

Figure 6:
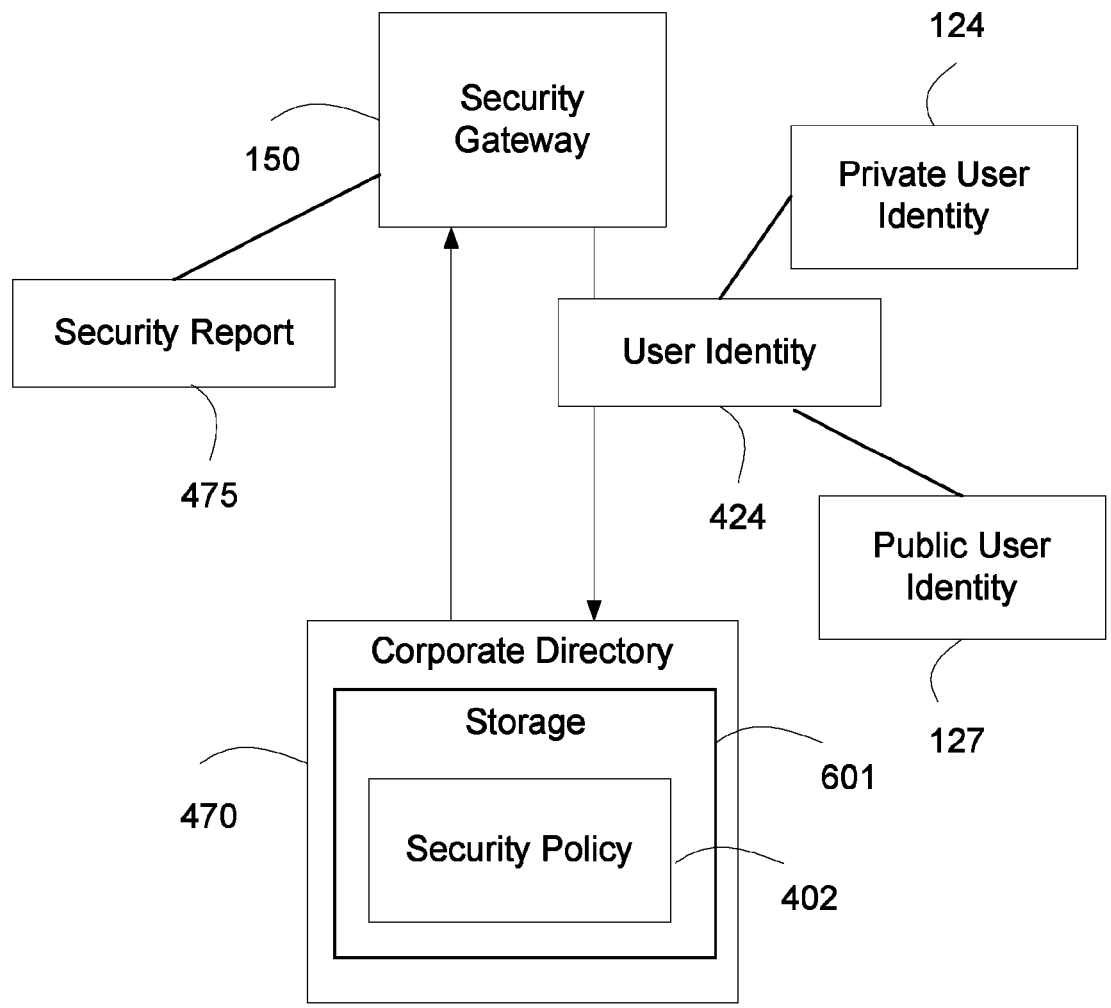
FIG. 6 illustrates an embodiment of a security gateway obtaining a security policy by querying a corporate directory.

By using the application session record, the private user identity 124 and the public user identity 127 for an application session 182 may be determined. In some embodiments as illustrated by FIG. 6, upon determining the public user identity and the private user identity, security gateway 150 obtains security policy 402 for the application session 182 by querying corporate directory 470. In an embodiment, corporate directory 470 comprises security policy 402. In some embodiments, corporate directory 470 is a server computer comprising a storage 601 that includes security policy 402. In some embodiments, corporate directory 470 is a database comprising security policy 402. In another embodiment, corporate directory 470 is a software module with program code stored on a computer readable medium (not shown) running in a computer. In some embodiments, corporate directory 470 resides in identity server 570. In some embodiments, corporate directory 470 uses directory technologies such as Microsoft Active Directory™, lightweight directory access protocol (LDAP) directory services, web services, directory services using Java™ technologies. In some embodiments, corporate directory 470 includes a policy server hosting security policy 402 and other policies.

Security gateway 150 queries corporate directory 470 for a security policy, where the query includes user identity 424. User identity 424 may include private user identity 124 or public user identity 127. Corporate directory 470 matches user identity 424 against security policy 402 and determines security policy 402 is applicable to user identity 424. In some embodiments security policy 402 maps network parameters to a user identity and there is a match between user identity 424 and the user identity in the security policy 402. In some embodiments, security policy 402 maps network parameters to a group identity (not shown) and user identity 424 is a member of the group identity. In response to finding the match between the user identity 424 and the user identity in the security policy 402, corporate directory 470 sends security policy 402 to security gateway 150.

In some embodiments, security gateway 150 generates security report 475 based on application session record 184 and security policy 402. In some embodiments, security gateway 150 generates security report 475 based on a pre-determined user identity or a list of pre-determined identities. For example, the security report may be generated based on an input of user identity or identities. In some embodiments, security gateway 150 generates security report 475 based on a pre-defined schedule or when requested by an operator.

Figure 7:
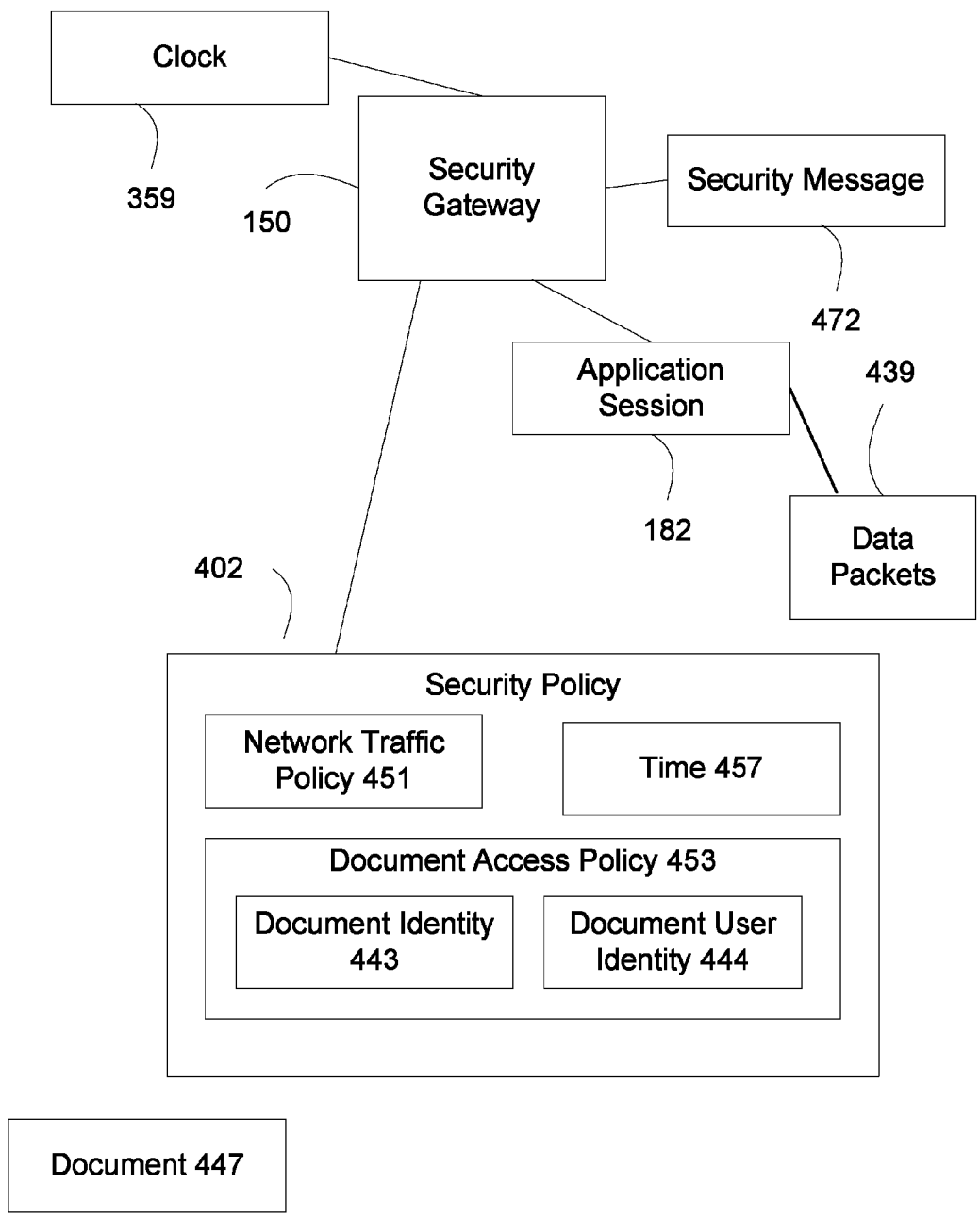
FIG. 7 illustrates a security policy including a security control.

In some embodiments, security policy 402 includes a security control function as illustrated in FIG. 7. Security gateway 150 applies the security policy 402 received from corporate directory 470 in response to the query to application session 182. Security policy 402 typically are configured by a company to protect against improper access to the company confidential documents and to protect against improper usage of the company secure network 160 vital for the company operation. In some embodiments, in response to receiving the security policy 402, the security gateway 150 confirms that the received security policy 402 contains a user identity that matches the user identity 424 sent in the query. In response to the confirmation, the security gateway 150 applies the security policy 402 to the application session 182. In FIG. 7, security policy 402 includes network traffic policy 451 or document access policy 453.

FIG. 8 illustrates a plurality of embodiments of network traffic policy 451. In some embodiments, network traffic policy 451 specifies network based application session access control indicating if user identity 424 is denied or allowed to continue application session 182. If denied, security gateway 150 may stop forwarding data packets 439 of application session 182. In some embodiments, network traffic policy 451 specifies bandwidth rate capacity such as 1 Mbps, 100 MB per day, or 5 GB per month. In an embodiment, bandwidth rate capacity is measured in packets such as 100 packets per second, 10 thousand packets per day or 4 million packets per month. In some embodiments, network traffic policy 451 specifies a quality of service (QOS) mapped to user identity 424 for application session 182. For example, network traffic policy 451 indicates a change of Differentiated Services Code Point (DSCP) marking in the data packets 439 of application session 182. In some embodiments, network traffic policy 451 specifies a queuing delay, a queuing priority, a packet forwarding path, a link interface preference, a server load balancing preference, a packet routing policy, or other control to handle data packets 439 of application session 182.

In some embodiments, network traffic policy 451 includes a traffic shaping control. In one example, traffic shaping control specifies a TCP profile such as a change of window segment size, or a TCP window adjustment.

In some embodiments, network traffic policy 451 indicates session connection rate control based on user identity 424 specifying a rate or capacity such as 10 session connections per second, 35 concurrent sessions, 100 sessions during lunch hour, 500 sessions a day, 24 voice sessions a day, or 75 file transfer sessions an hour. In some embodiments, network traffic policy 451 may specify, when exceeding the rate or capacity, if application session 182 is denied or data packets 439 of application session 182 are dropped.

In some embodiments, network traffic policy 451 includes application session modification control mapped to user identity 424, specifying how data packets 439 of application session 182 are modified for the user with the user identity 424. In one example, application session modification control specifies security gateway 150 should perform network address translation (NAT) to application session 182 for user identity 424. In one example, security gateway 150 should perform port address translation (PAT) to application session 182 using a pre-determined port number for user identity 424. In another example, security gateway 150 should perform content substitution if application session 182 is an HTTP session and if a Universal Resource Locator (URL) in data packets 439 of application session 182 matches a pre-determined URL for user identity 424. In an example, security gateway 150 should perform filename substitution if application session 182 is a file transfer session and if a filename matching a pre-determined filename is found in data packets 439 of application session 182 for user identity 424. In another example, security gateway 150 should insert a cookie for user identity 424 if application session 182 is an HTTP session, with optionally data packets 439 matching a pre-determined POST or GET request of a URL.

Returning to FIG. 7, in some embodiments, document access policy 453 specifies if access to document 447 is allowed or denied. In some embodiments, document 447 includes a file, a business agreement, a contract, a spreadsheet, a presentation, a drawing, a textual document, a manual, a program, a piece of software program, a design, a product specification, a datasheet, a video file, an audio file, an email, a voice mail, a fax, a photocopy of a document, or any business document. In some embodiments, document 447 includes a URL leading to digital information such as database query result, a web page, a video, or a piece of music. In some embodiments, document 447 includes real time transfer or streaming of information such as video streaming, audio streaming, a web cast, a podcast, a video show, a teleconference session, or a phone call. In some embodiments, document access policy 453 includes document identity 443 and document user identity 444. Document identity 443 identifies document 447. Document user identity 444 identifies the user whose access to the document 447 is affected by the document access policy 453. In an embodiment, security gateway 150 compares user identity 424 with document user identity 444. In response to determining that the user identity 424 matches the document user identity 444, in some embodiments, security gateway 150 allows document 447 with document identity 443 to be accessed by user identity 424. In another embodiment, security gateway 150 denies access to document 447 with document identity 443. In denying access, the security gateway 150 may disconnect application session 182 or discard data packets 439. In some embodiments, security gateway 150 confirms that data packets 439 include document identity 443. In response to confirming that data packets 439 include document identity 443, security gateway 150 applies document access policy 453.

In some embodiments security policy 402 includes time 457 where security policy 402 is applicable within time 457. In some embodiments, time 457 indicates a beginning time such as 8 am, 4 pm, midnight. In an embodiment, time 457 indicates a time range such as 8 am to 10 am, 7 pm to 5 am, morning hours, lunch, rush hour, prime time. Security gateway 150 compares clock 359 with time 457 and determines if security policy 402 is applicable.

In some embodiments, security gateway 150 generates security message 472 when security gateway 150 determines if security policy 402 is applicable to application session 182 for user identity 424. In some embodiments, security gateway generates security message 472 when security gateway 150 applies security policy 402 to application session 182. In some embodiments, security report 475 includes security message 472. In one example, security message 472 includes security policy 402 and user identity 424. In one example, security message 472 includes the actions security gateway 150 applies to application session 182 using security policy 402.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by the Claims following.

What is claimed is:

1. A method for applying a security policy to an application session, comprising:

inspecting, by a security gateway, a data packet for an application session and storing a host identity and application session time in an application session record;

determining, by the security gateway, from the data packet for the application session a user identity and storing the user identity in the application session record;

determining, by the security gateway, a second user identity by matching an access session record of an access session accessed during the application session that comprises the second user identity, a second host identity, and an access session time, wherein the second host identity and the access session time match the host identity and the application session time of the application session record;

storing the second user identity as a network user identity in the application session record;

determining, by the security gateway, at least one security policy applicable to the application session based on a group identity; and applying the at least one security policy to the application session, by the security gateway, if the network user identity is a member of the group identity.

2. The method of claim 1, wherein the determining, by the security gateway, at least one security policy applicable to the application session further comprises determining that the at least one security policy is applicable for a time period.

3. The method of claim 1, wherein the at least one security policy comprises a network traffic policy.

4. The method of claim 3, wherein the network traffic policy comprises a bandwidth rate capacity for a network.

5. The method of claim 3, wherein the network traffic policy comprises a quality of service mapped to the network user identity for the application session.

6. The method of claim 3, wherein the network traffic policy comprises one or more of: a queuing delay, a queuing priority, a packet forwarding path, a link interface preference, a server load balancing preference, and a packet routing policy.

7. The method of claim 3, wherein the network traffic policy comprises a traffic shaping control.

8. The method of claim 7, wherein the traffic shaping control comprises a TCP profile.

9. The method of claim 3, wherein the network traffic policy comprises an application session modification control based on the network user identity.

10. A computer program product for applying a security policy to an application session, the computer program product comprising:

a non-transitory computer readable storage medium having computer readable program code embodied thereon, the computer readable program code configured to:

inspect, by a security gateway, a data packet for an application session and storing a host identity and application session time in an application session record;

determine, by the security gateway, from the data packet for the application session a user identity and store the user identity in the application session record;

determine, by the security gateway, a second user identity by matching an access session record of an access session accessed during the application session that comprises the second user identity, a second host identity, and an access session time, wherein the second host identity and the access session time match the host identity and the application session time of the application session record;

store the second user identity as a network user identity in the application session record;

determine, by the security gateway, at least one security policy applicable to the application session based on a group identity; and apply the at least one security policy to the application session, by the security gateway, if the network user identity is a member of the group identity.

11. The computer program product of claim 10, wherein the computer readable program code configured to determine, by the security gateway, at least one security policy applicable to the application session is further configured to determine that the at least one security policy is applicable for a time period.

12. The computer program product of claim 10, wherein the at least one security policy comprises a network traffic policy.

13. The computer program product of claim 12, wherein the network traffic policy comprises a bandwidth rate capacity for a network.

14. The computer program product of claim 12, wherein the network traffic policy comprises a quality of service mapped to the network user identity for the application session.

15. The computer program product of claim 12, wherein the network traffic policy comprises one or more of: a queuing delay, a queuing priority, a packet forwarding path, a link interface preference, a server load balancing preference, and a packet routing policy.

16. The computer program product of claim 12, wherein the network traffic policy comprises a traffic shaping control.

17. The computer program product of claim 16, wherein the traffic shaping control comprises a TCP profile.

18. The computer program product of claim 12, wherein the network traffic policy comprises an application session modification control based on the network user identity.

19. A system, comprising:

a corporate directory comprising at least one security policy; and a security gateway, wherein the security gateway:

inspects a data packet for an application session and stores a host identity and application session time in an application session record;

determines from the data packet for the application session a user identity and stores the user identity in the application session record;

determines a second user identity by matching an access session record of an access session accessed during the application session that comprises the second user identity, a second host identity, and an access session time, wherein the second host identity and the access session time match the host identity and the application session time of the application session record;

stores the second user identity as a network user identity in the application session record;

determines at least one security policy applicable to the application session based on a group identity; and applies the at least one security policy to the application session if the network user identity is a member of the group identity.

20. The system of claim 19, wherein the determines at least one security policy applicable to the application session further comprises determines that the at least one security policy is applicable for a time period.

21. The system of claim 19, wherein the at least one security policy comprises a network traffic policy.

22. The system of claim 21, wherein the network traffic policy comprises a bandwidth rate capacity for a network.

23. The system of claim 21, wherein the network traffic policy comprises a quality of service mapped to the network user identity for the application session.

24. The system of claim 21, wherein the network traffic policy comprises one or more of: a queuing delay, a queuing priority, a packet forwarding path, a link interface preference, a server load balancing preference, and a packet routing policy.

25. The system of claim 21, wherein the network traffic policy comprises a traffic shaping control.

26. The system of claim 25, wherein the traffic shaping control comprises a TCP profile.

27. The system of claim 21, wherein the network traffic policy comprises an application session modification control based on the network user identity.

* * * * *